J. T. RYDBERG.
FLYING MACHINE AEROPLANE.
APPLICATION FILED MAR. 22, 1909.
993,623.
Patented May 30, 1911.
6 SHEETS—SHEET 1.
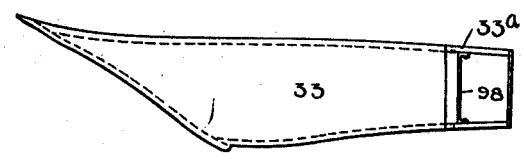
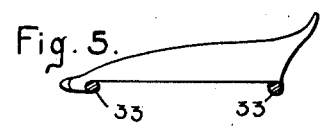
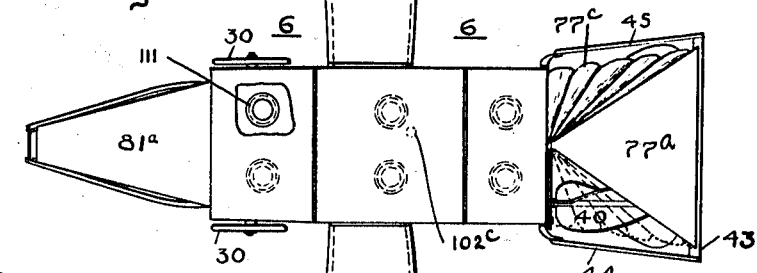
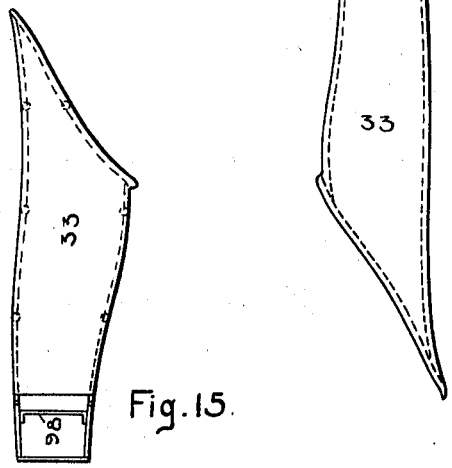
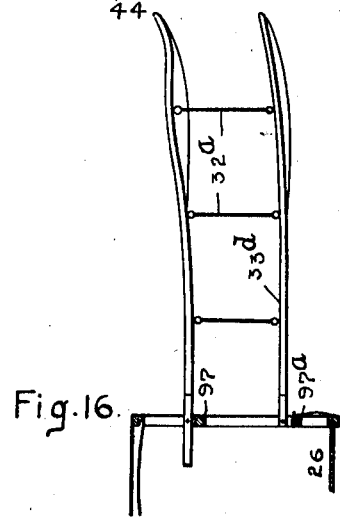
Witnesses
Inventor
John T. Rydberg
By his Attorney
H. C. Karlson

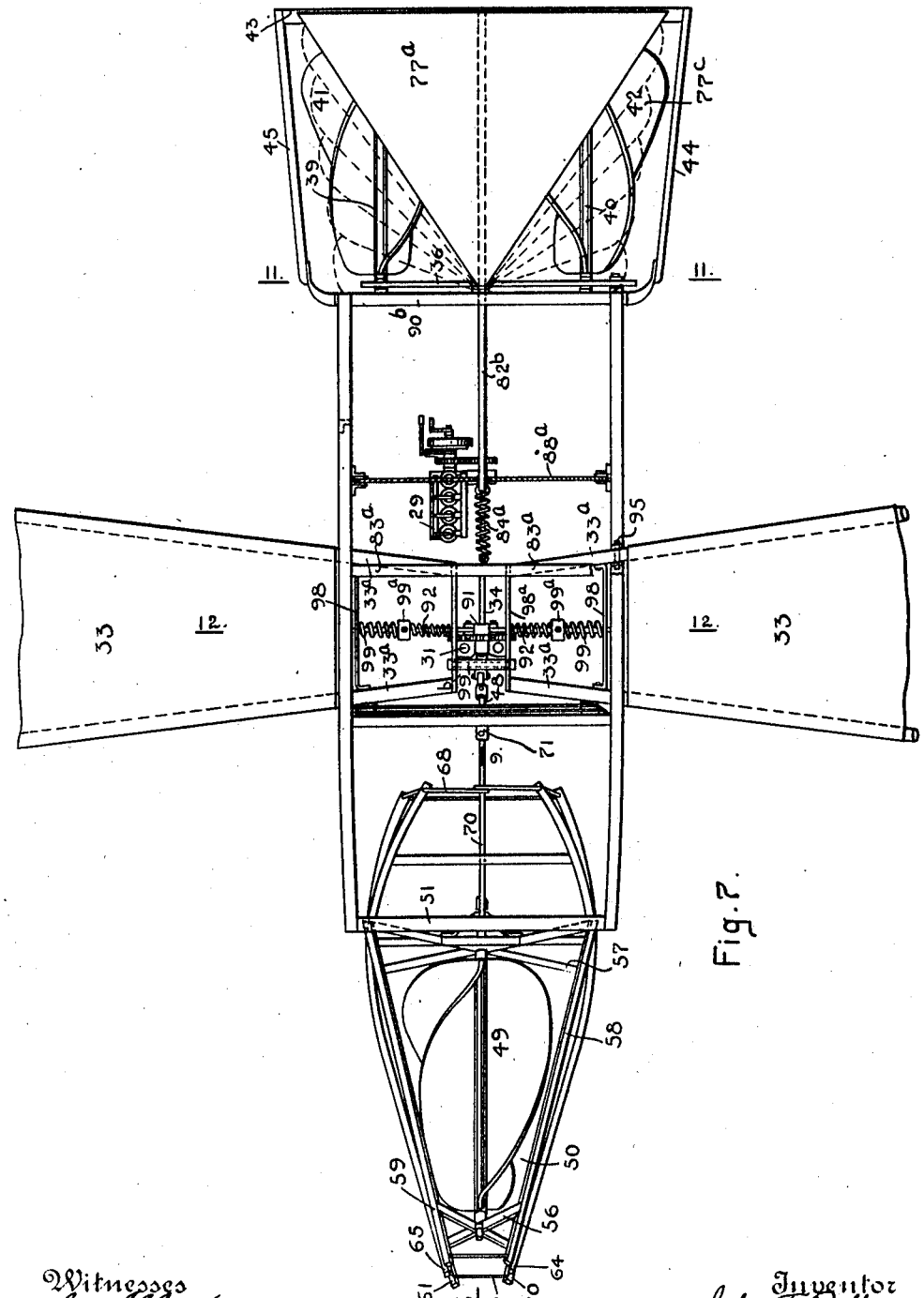

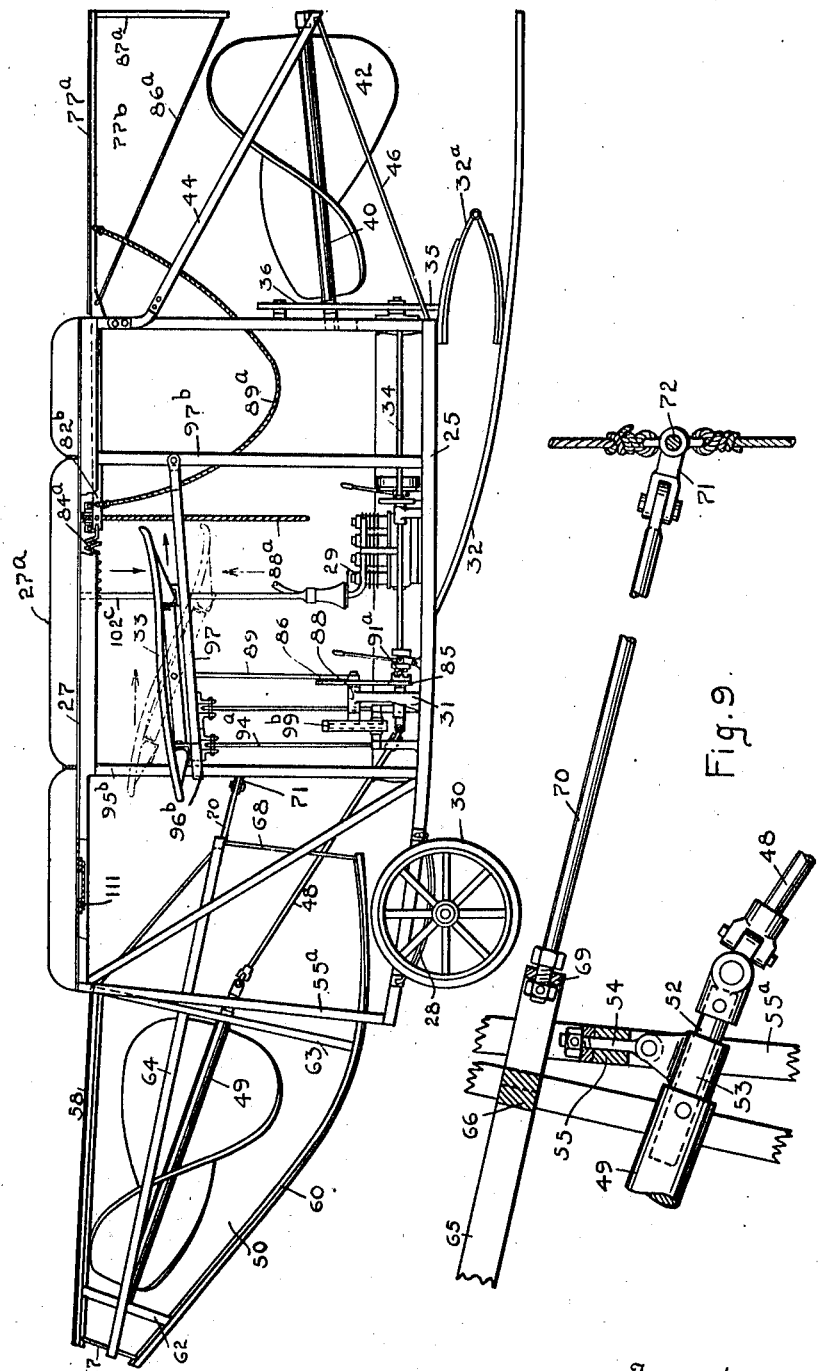

J. T. RYDBERG.
FLYING MACHINE AEROPLANE.
APPLICATION FILED MAR. 22, 1909.

993,623.

Patented May 30, 1911.
6 SHEETS—SHEET 4.

Witnesses
C. Albrecht
P. Dittrichsen

By his Attorney
N. C. Karlson

Inventor
John T. Rydberg

J. T. RYDBERG.
FLYING MACHINE AEROPLANE.
APPLICATION FILED MAR. 22, 1909.

993,623.

Patented May 30, 1911.
6 SHEETS—SHEET 5.

Witnesses
C. Albrecht
P. Dietrichsen

Inventor
John T. Rydberg
By his Attorney
H. C. Karlson

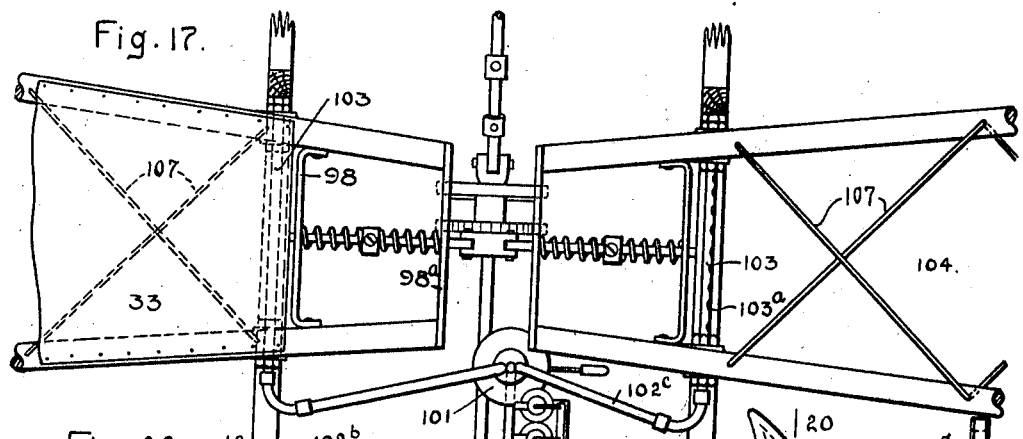
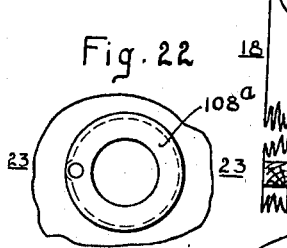
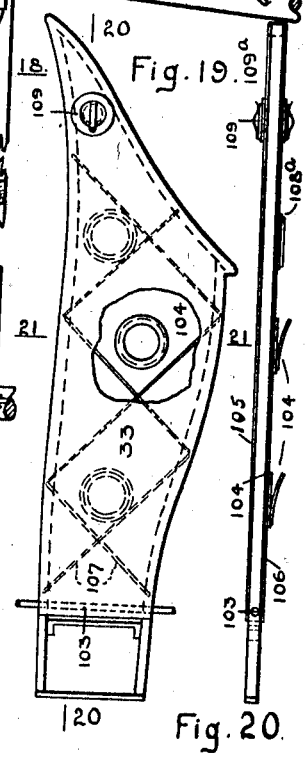
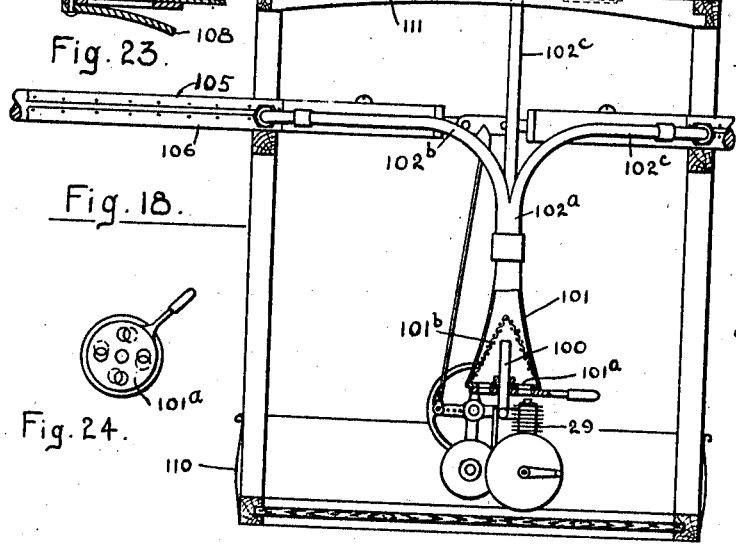

UNITED STATES PATENT OFFICE.

JOHN T. RYDBERG, OF GARWOOD, NEW JERSEY.

FLYING-MACHINE AEROPLANE.

993,623.

Specification of Letters Patent. Patented May 30, 1911.

Application filed March 22, 1909. Serial No. 485,032.

*To all whom it may concern:*

Be it known that I, JOHN T. RYDBERG, a citizen of the United States, and a resident of Garwood, in the county of Union and State of New Jersey, have invented certain new and useful Improvements in Flying-Machine Aeroplanes, of which the following is a specification.

My invention relates to a combined flying machine and aeroplane, and particularly to the type thereof in which the propelling mechanism assists the steering device of the apparatus and also in which lifting means contribute to maintain the machine in proper equilibrium as well as in driving the same.

Figure 10:
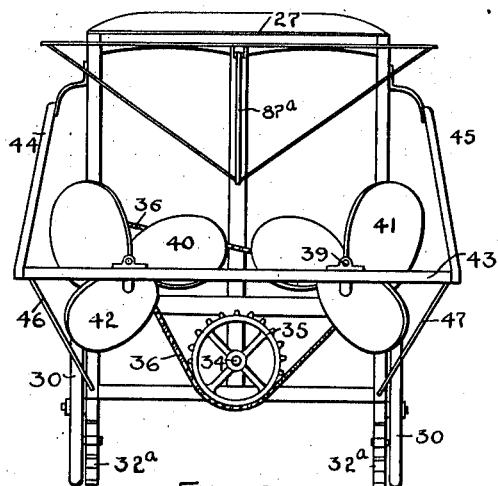
Figure 11:
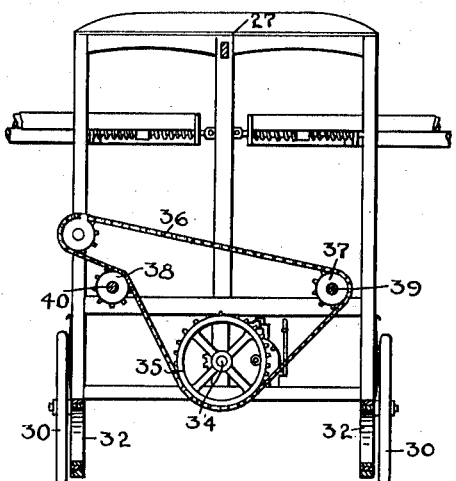
Figure 12:
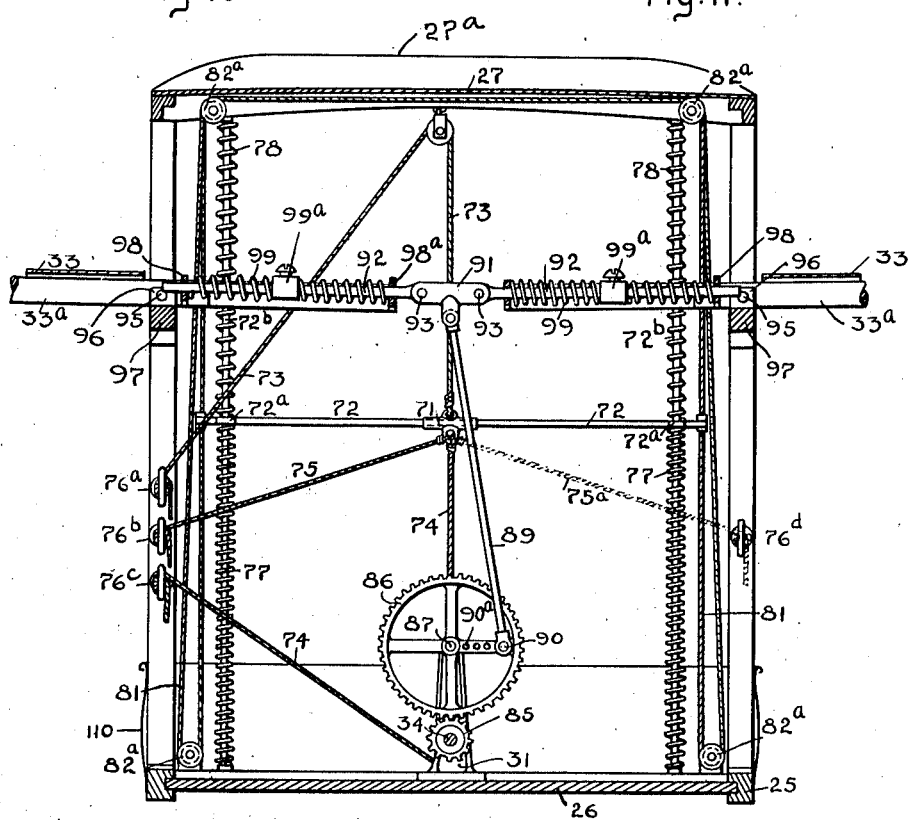
Figure 13:
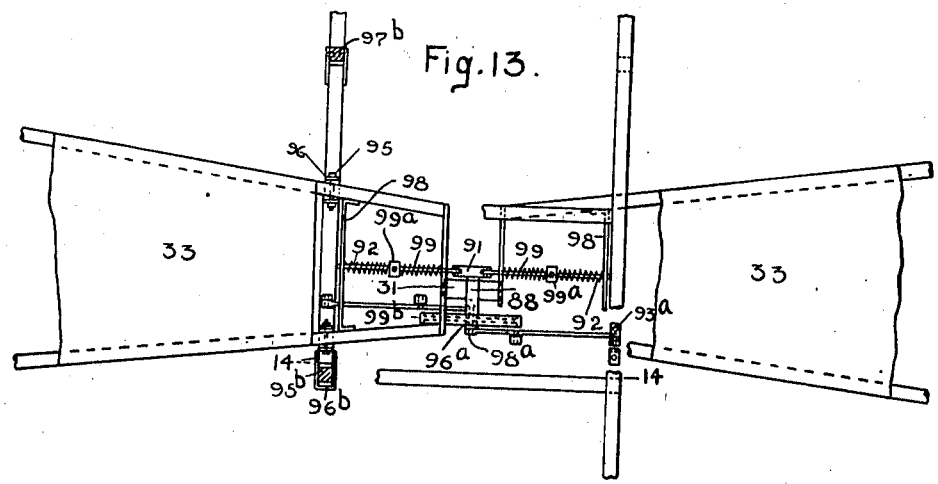
Figure 14:
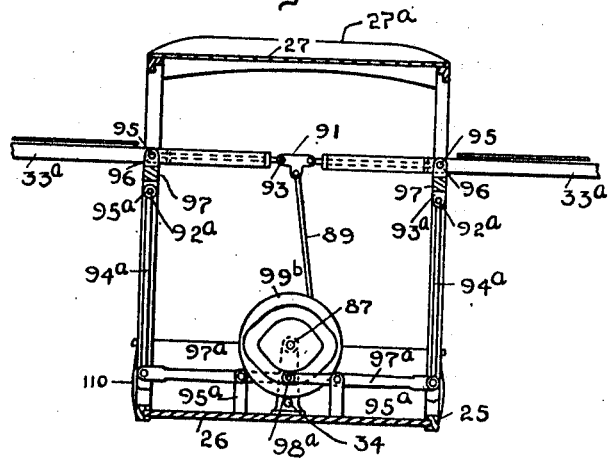

In the accompanying drawings Figure 1 is a top plan view of the invention. Fig. 2 is a detail plan view of one of the wings. Fig. 3 is a front view of Fig. 2. Fig. 4 is a perspective sectional view on the line 4—4 of Fig. 1. Fig. 5 is a perspective sectional view on the line 5—5 of Fig. 1. Fig. 6 is a perspective sectional view on the line 6—6 of Fig. 1. Fig. 7 is an enlarged top plan view of the invention with the top cover thereof removed. Fig. 8 is a side view of Fig. 7. Fig. 9 is an enlarged detail showing the flexible power transmission, and adjusting means. Fig. 10 is a right-hand end view of Fig. 7. Fig. 11 is a section on line 11—11 of Fig. 7. Fig. 12 is an enlarged section on line 12—12 of Fig. 7. Fig. 13 is a partial plan view of the invention showing the tilting device for the wings. Fig. 14 is a partial section on line 14—14 of Fig. 13. Fig. 15 is a top plan view of a modification of the wings and Fig. 16 is a right-hand side view of Fig. 15. Fig. 17 is a partial top plan view of the invention showing connections between the motor and the chamber of the wings and the upper carrying plane. Fig. 18 is a partial section on line 18—18 of Fig. 17. Fig. 19 is a detail plan view of a modification of the wing. Fig. 20 is partial section on line 20—20 of Fig. 19. Fig. 21 is a section on line 21—21 of Fig. 20. Fig. 22 is a detail of one of the wing valves. Fig. 23 is a section on line 23 of Fig. 22. Fig. 24 is an enlarged bottom plan view of the adjustable air inlet for the exhaust and air mixer.

The construction of the invention embodies a partially curved platform 26 with the girders 25 and an upper carrying plane 27. The platform 26 carries the motor 29 and the stand 31 for the propelling mechanism of the lifting wings 33. Springs 28 extend below the forward end of the platform 26, to which are journaled wheels 30 and which constitute flexible carrying means for the machine. The rear end of the apparatus is supported by the skids 32, resiliently attached thereto by means of the springs 32$^a$. The said skids 32 act as brakes against the ground when alighting.

The motor 29 with its regulating levers is placed somewhat at a distance from the center of the apparatus. The aviator takes his place alongside the motor to control the same, and to balance the apparatus. The motor 29 is detachably connected to the main shaft 34. Power is transmitted from the said shaft 34 by means of the main rear sprocket wheel 35. A chain 36 runs respectively over the outside and the inside circumferential edges of the sprocket wheels 37 and 38 and the shafts 39 and 40 on which the sprocket wheels 37 and 38 are mounted rotate therefore in opposite directions. The rear propellers 41 and 42 which are respectively secured to the shafts 39 and 40 have oppositely winding pitches to balance the stability of the apparatus while in motion. The propellers have each an increasing pitch as well as increasing diameter toward their rear ends, so that the acceleration of the air when set in motion at the front end of the propellers is followed up by an increased inclination of the propeller blades. The air is thus utilized to the fullest extent and the corners of the propellers are rounded to reduce the eddy currents around the same. The outboard ends of the shafts 39 and 40 are supported and journaled on the cross rail 43, which latter is supported by the top braces 44 and 45 and the bottom braces 46 and 47; the said top and bottom braces serve also as guards for the rear propellers.

The forward end of the shaft 34 is provided with a flexible extension 48 which is connected with the forward propeller shaft 49. A guard cage 50 is suspended from the top brace 51 of the upper carrying plane 27. The construction of the connection between the forward propeller shaft is shown particularly in Fig. 9. A short connecting shaft 52 passes through the socket 53 which is suspended from an eyebolt 54, that passes through the horizontal member 55 which is located between the uprights 55$^a$. The guard cage 50 comprises the front and rear cross braces 56 and 57, which have attached thereto the upper corner pieces 58 and 59, and the lower corner pieces 60 and 61. The up and down front pieces 62 and the up and down rear pieces 63 have attached thereto the side pieces 64 and 65. The latter extend inwardly between the platform 26, and the upper carrying plane 27. A horizontal cross piece 66 is located between the upper corner pieces 58 and 59 to brace the inward extension of the said corner pieces.

The guard cage 50 is provided at its front end with ties 67 and at its rear end with the ties 68. An end cross piece 69 connects the inwardly projecting ends of the side pieces 64 and 65. A rod 70 has one end attached to the end cross piece 69, and the other end of the rod 70 engages a swivel joint 71 that is adjustably mounted on a cross rod 72. By moving the cross rod 72 up or down the front end of the guard cage 50, which carries the forward propeller 49, is made to point up or down, and the horizontal level of the apparatus is controlled thereby. Ropes 73 and 74 are provided to control the movements of the cross rod 72. The horizontal movement of the swivel joint 71 is controlled by the ropes 75 and 75$^a$. Hitching buttons 76$^a$, 76$^b$, 76$^c$, and 76$^d$, are provided for hitching the ropes, 73, 74, 75, and 75$^a$. The rod 72 is provided with guide openings 72$^a$ for the vertical rods 72$^b$. Coil springs 77 and 78 surround the said rods 72$^b$ between the outer ends of the rods 72 and the platform 26 and plane 27, to reduce the effect of any sudden shocks on the part of the structure that supports or controls the front propeller 49. In maneuvering the machine when alighting or avoiding objects on its way the ropes 73, 74, 75, and 75$^a$, are cast off their respective buttons, and the aviator by taking hold of the swivel joint 71 can control the machine by moving the said joint up or down or sidewise. An endless guide rope 81 running over the sheaves 82$^a$ assists in equalizing the motion of the cross rod 72.

The stand 31 on the platform 26 supports the main shaft 34. A pinion 85, which is detachably secured to the said shaft 34, engages the gear 86 that is secured to the upper shaft 87, supported in the top bearing 88 of the stand 31. A connecting rod 89 has one end supported on the crank pin 90, adjustably connected to the gear 86, while the other end of the connecting rod 89 is pinned to the socket 91. A series of holes 90$^a$ are provided on the gear 86 to vary the point of connection of the connecting rod therewith, so that the stroke of the wings can be varied. Sliding rods 92 are hinged on the pins 93 carried by the socket connection 91. The frames 33$^a$ of the wings 33 are hinged on the pins 95 that pass through both the frames 33$^a$ and the bracket 96. The said bracket 96 is secured to the moving beam 97. Guide braces 98 and 98$^a$ hold the frames 33$^a$ together and guide the ends of the sliding rods 92 through the same. Springs 99 provide resilient means whereby the shock in reversing the wings is reduced. A set collar 99$^a$ located on the sliding rod 92 adjusts the initial strain on the springs 99.

A double faced cam 99$^b$ is secured on the forward end of the shaft 87. Cam rollers 96$^a$ engage the grooves of the said cam 99$^b$. Horizontal levers 97$^a$ are fulcrumed on the blocks 95$^a$ which are attached to the platform 26. The said levers 97$^a$ are provided with roller pins 98$^a$ that carry the cam rollers 96$^a$. The outer ends of the levers 97 are coupled with the vertical side connecting rods 94$^a$, the upper end of the said connecting rods being pinned to the under side of the moving beam 97 by means of the brackets 93$^a$ and the pinbolt 92$^a$.

In the operation of the wings 33 when they are moved from one of their levels to the other, they are tilted and their planes make reversed angles with each other, as shown in the full and dotted lines in Fig. 8. The tilted position of the wings allows them to act as propelling wings in addition to their lifting functions by reason of the resistance of the air with the under side of the said wings when they are lowering, and the resistance of the air with the upper faces of the wings when they are rising. The moving beam 97 is hinged to the upright 97$^b$ and is guided in its movement by a strap 96$^b$, which is guided by the upright 95$^b$. A cut off coupling 91$^a$ is provided whereby the pinion 85 can be disengaged so that the wings can be held stationary while the propellers are in operation. Directly over the rear propellers 41 and 42 the fan shaped rudder 77$^a$ is suspended from the rear top brace 90$^b$. Controlling ropes 89$^a$ and 88$^a$ are provided respectively for the horizontal and vertical movement of the rudder. The rudder 77$^a$ is composed of an upper horizontal plane 77$^a$ and a vertical plane 77$^b$. The strut 87$^a$ and the tie 86$^a$ give necessary stiffness to the rudder. To give continuity to the upper carrying plane, loosely fitted side pieces 77$^c$ are attached between the rudder 77$^a$ and the cross brace 90$^b$. A coil spring 84$^a$ is attached to the upper intermediate cross brace 83$^a$ and the end of the rudder member 82$^b$, by which shocks will be taken up. Canvas or the like is stretched over the framework that forms the upper plane and extends from the forward end of the rudder 82$^a$ to the forward cross brace 51. A separate cover 81$^a$ is stretched over the guard cage 50. The area of the upper plane 27 extends from the forward point of the guard cage 50 and includes the end of the rudder 77$^a$.

The construction of the wings is shown in Figs. 1 to 6 when the members that form the wings are made curved so as to give the required strength and elasticity. The rear edges of the wings are slightly turned up at their middle portions, the ends of the wings being pointed to imitate the wings of a bird.

In the modifications shown in Figs. 15 and 16 the main part of the wing 33 carries a sub-wing 33$^d$ which receives its motion from the main wing, both of the wings being hinged in the same vertical plane and connecting links 32$^a$ support and guide the said wings.

Another modification of the invention is shown in the Figs. 17 to 24, where the exhaust pipe 100 from the motor 29 extends into an air mixer 101. The currents of the burned gases of the motor act similarly to an injector and impart motion to a large volume of air which is drawn through the adjustable bottom openings 101$^a$. A cone shaped net 101$^b$ prevents back fire from the motor 29 to be transmitted through the pipes 102$^a$, 102$^b$, 102$^c$, and 102$^d$. The said pipes are connected to the hollow trunnions 103 on which the wings 33 are supported. Holes 103$^{a'}$ allow the mixed air and burned gases to escape into the chamber 104 formed by the top covering 105 and the bottom covering 106, on both sides of the members 33$^a$ that form the wing 33. Cross wires 107 are stretched under the coverings 105 and 106 to prevent the collapse of the wings 33. Flap valves 108 are attached to metal rims 108$^a$ which are secured to the bottom coverings 106. Relief valves 109 are provided on both sides of the wings 33 near their tip ends and are loaded to stand a certain amount of pressure by means of the springs 109$^a$. In the operation of the device the gases of combustion which are cooled by being mixed with a large volume of air issue through the flap valves 108 during the up strokes of the wings 33. The said valves are opened by the motion of the wings 33 and by the pressure within the said wings. The heated air and gases pass through said valves 108. By virtue of the reaction from the issuing fluid and the lighter than air medium within the wings 33 a reaction counterbalancing the downward movement of the machine from the upward motion of the wings is produced. A branch pipe 102$^e$ connects the upper plane 27 having a top covering 27$^a$ of flexible material which forms an inclosed chamber with the said plane. The heated air mixture enters the said chamber and aids in the buoyancy of the apparatus, and the bottom valves 111 allow the escape of the fluid when a desired density has been reached. An annular partition 110 extends up from the platform 26 whereby buoyancy is obtained should the apparatus land in the water.

Having described my invention I claim:

1. In a flying machine and aeroplane the combination of a lower platform, an upper carrying plane above the platform, a front propeller adjustably mounted with respect to the latter, flexible transmission means for said front propeller, resilient controlling means for the said adjustable front propeller, stationary supported rear propellers in the machine, a combined two plane rudder over said rear propellers, and resilient controlling means for the rudder.

2. In a flying machine and aeroplane the combination of a driving shaft, a stand with the lower portion thereof supporting the shaft, a pinion detachably connected to said shaft, a pair of wings pivoted to the machine, a gear with its teeth meshing with said pinion, a connecting rod with one end adjustably connected to said gear, a socket pivoted to the other end of the connecting rod, and sliding rods pivoted to each socket resiliently actuating the wings.

3. In a flying machine and aeroplane the combination of a lower platform, a stand on the platform, a driving shaft journaled in said stand, a detachably connected pinion on said shaft, a gear engaging said pinion, the said gear secured to one end of an upper shaft, the said shaft supported in a bearing, a cam secured to the other end of the said upper shaft, levers mounted on blocks secured to the said lower platform, grooves in the cam, one end of the said levers engaging said cam grooves, movable beams over the said platform, side wings pivoted to the beams, and connections between the outboard ends of the said levers and the said moving beam.

4. In a flying machine and aeroplane the combination of a lower platform, a motor on the said platform, an air mixer, the exhaust of said motor discharging into the air mixer, regulating means for said air mixer, back fire preventing means for said air mixer, hollow side wings pivoted on the machine, and means whereby air may be conducted from said mixer to said wings.

5. In a flying machine, the combination with a frame, of a pair of stationary propellers carried at the rear of said frame, a vertically adjustable propeller carried at the forward end of said frame, a motor supported by said frame, means whereby said propellers are operated from said motor, horizontal wings extending from said frame, and means whereby a double movement may be imparted to said wings.

6. In a flying machine, the combination with a frame, of a pair of stationary propellers carried at the rear of said frame, a vertically adjustable propeller carried at the forward end of said frame, a motor supported by said frame, means whereby said propellers are operated from said motor, horizontal wings extending from said frame, a bracket coöperating with said motor, a shaft carried by said bracket driven by the shaft of the motor, a gear mounted on said shaft adapted to impart a vertical movement to said wings, and means whereby a torsional movement may be imparted to the wings.

7. In a flying machine, the combination with a frame, of a pair of stationary propellers carried at the rear of said frame, a vertically adjustable propeller carried at the forward end of said frame, a motor supported by said frame, means whereby said propellers are operated from said motor, horizontal wings extending from said frame, a bracket coöperating with said motor, a shaft carried by said bracket driven by the shaft of the motor, a gear mounted on said shaft adapted to impart a vertical movement to said wings, and a cam likewise carried by said shaft, levers coöperating with said cam, links connecting said levers to said wings, said levers and links adapted to impart a torsional movement to said wings.

Signed at Garwood in the county of Union and State of New Jersey this 20th day of March A. D. 1909.

JOHN T. RYDBERG.

Witnesses:
EDWARD BALDWIN,
WILLIAM W. MENDELL.